United States Patent [19]
Barthelmes et al.

[11] Patent Number: 4,750,331
[45] Date of Patent: Jun. 14, 1988

[54] PROCESS FOR THE SURFACE COOLING OF FOOD PRODUCTS

[75] Inventors: Patrice Barthelmes, Jouy-en-Josas; Thierry Dubreuil, Beynes; Claude Ottinger, Bures-sur-Yvette, all of France

[73] Assignee: L'Air Liquide, Paris, France

[21] Appl. No.: 49,296

[22] PCT Filed: Oct. 2, 1986

[86] PCT No.: PCT/FR86/00339
§ 371 Date: Apr. 20, 1987
§ 102(e) Date: Apr. 20, 1987

[87] PCT Pub. No.: WO87/01913
PCT Pub. Date: Apr. 9, 1987

[30] Foreign Application Priority Data
Oct. 2, 1985 [FR] France ................. 85 14582

[51] Int. Cl.$^4$ ............................................. F25D 25/00
[52] U.S. Cl. ............................................. 62/62; 62/388
[58] Field of Search ............................. 62/384, 388, 62

[56] References Cited
U.S. PATENT DOCUMENTS

| 3,315,480 | 4/1967 | Rich | 62/63 |
| 3,507,128 | 4/1970 | Murphy et al. | 62/63 |
| 3,905,555 | 9/1975 | Gateshill et al. | 239/573 |
| 4,157,018 | 6/1979 | Goltsos | 62/373 |
| 4,157,650 | 6/1979 | Guibert | 62/374 |
| 4,187,325 | 2/1980 | Tyree, Jr. | 62/64 |
| 4,356,707 | 11/1982 | Tyree, Jr. et al. | 62/384 |
| 4,399,658 | 8/1983 | Nielsen | 62/388 |
| 4,448,029 | 5/1984 | Keller | 62/63 |
| 4,640,460 | 2/1987 | Franklin, Jr. | 62/384 |

FOREIGN PATENT DOCUMENTS

| 613093 | 11/1926 | France . |
| 1003677 | 3/1952 | France . |
| 1453906 | 9/1966 | France . |
| 2070749 | 9/1971 | France . |
| 2133502 | 12/1972 | France . |
| 2211633 | 7/1974 | France . |
| 2271521 | 12/1975 | France . |
| 2306413 | 10/1976 | France . |
| 2398987 | 2/1979 | France . |
| 2506914 | 12/1982 | France . |

Primary Examiner—Ronald C. Capossela
Attorney, Agent, or Firm—Lee C. Robinson, Jr.

[57] ABSTRACT

The invention concerns the surface cooling of food products.

Nozzles project particles of carbon dioxide snow in the direction of a conveyor. The nozzles have sufficiently fine sections (0.2 sq mm / 1.13 sq mm) to create fine particles having sizes of less than 300 microns.

2 Claims, 1 Drawing Sheet

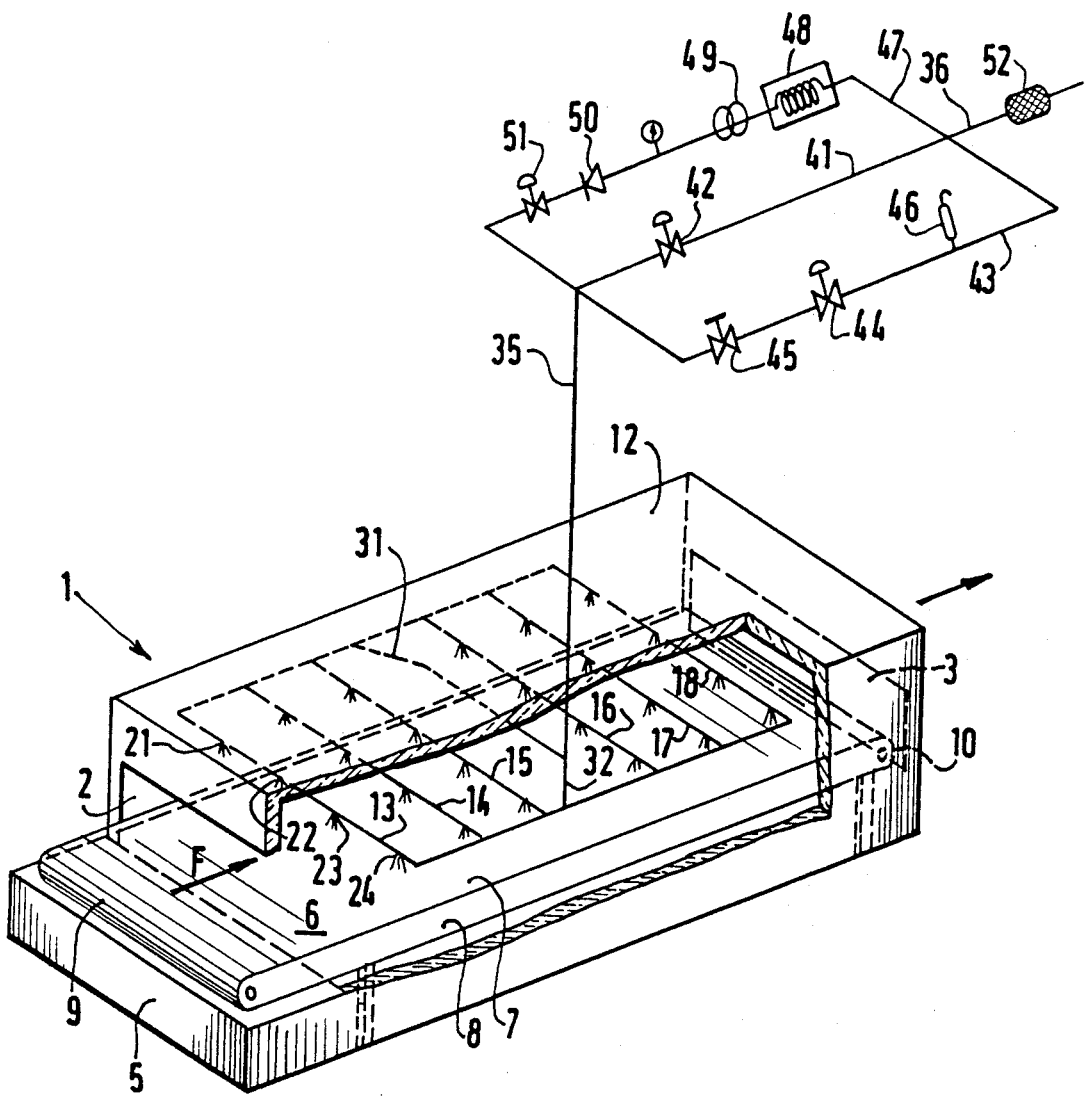

PROCESS FOR THE SURFACE COOLING OF FOOD PRODUCTS

The invention relates to the surface cooling of food products, of the type in which said products are subjected, in a confined zone thermally insulated from the surroundings, to the cryogenic action of particles formed by the expansion of carbon dioxide under pressure and in the liquid state through nozzles oriented toward the mean surface offered by the products in the course of the surface cooling, and of the type employing spraying under pressure. This surface cooling, or crusting, permits the subsequent treatment of all food products including the most fragile such as broccoli and mushrooms. As the case may be, after this "crusting", a deep freezing is carried out. According to the technique recalled above, the expansion of carbon dioxide is usually accompanied by an intense ventilation so that it is not possible to produce the cryogenic effect of the solid particles of the carbon dioxide snow directly on the surface of the product to be cooled. Moreover, the carbon dioxide snow is constituted by large particles which, in accumulating, form a layer of snow which hardly promotes a good thermal transfer.

An object of the present invention is to provide a process of this type whereby it is possible to obtain remarkable performances in respect of the thermal transfer of the carbon dioxide snow to the surface of the product; further, the cooling process and the equipment are particularly simple and reliable, with no risk of breakdown due to a clogging of the conduits by the solid particles of carbon dioxide; in addition, there is the benefit of very high precision owing to a correct determination of temperature in the cooling tunnel. These results are obtained, according to the invention, in that there is ensured a quasi-instantaneous sublimation of the solid particles of carbon dioxide in contact with the products by choosing nozzles of the type providing a spraying under pressure having an ejection section of between 0.2 sq mm and 1.13 sq mm and an ejection pressure of between 6 and 30 bars, producing a composite jet of fine solid particles whose sizes are between 20 microns. The fine solid particles are and 300 microns rapidly carried along in a gaseous current exclusively composed of carbon dioxide resulting from said expansion, the flow rate and the pressure of carbon dioxide being so regulated as to produce a flow rate of fine solid particles which is lower than 0.5 kg/hr per sq cm of the surface area of the product, the duration of the treatment being between 0.5 minute and 5 minutes (min).

All of these measures permit the obtainment of the mentioned results. the fineness of the particles carried along with the minimum of ventilation, i.e. with no accompanying stirring means, permit the deposit of a fine layer of micronic particles on the products to be cooled which is immediately sublimated to form a layer of snow, which ipso-facto ensures the best thermal transfer effect. Moreover, the random dispersion of the particles outside said surfaces is avoided. Further, by an ingenious regulation of the flow rate and the pressure of the carbon dioxide, the surface cooling is ensured under conditions of short duration with a minimum flow of solid particles.

The invention also concerns a surface cooling tunnel of the type comprising an elongated insulating body with an inlet and an outlet at the two longitudinal ends, a flat conveyor, a plurality of nozzles distributed in said elongated body, connected by a conduit and valves to a tank containing carbon dioxide under pressure, and this tunnel is characterised in that said nozzles are all oriented toward the flat conveyor and have ejection sections of between 0.2 and 1.13 sq mm.

The invention is now described with reference to the accompanying drawings in which the single figure is a perspective view, with a part cut away, of a refrigeration tunnel.

With reference to the drawings, a tunnel comprises an elongated insulation case 1 having a rectangular parallelepipedic shape with an inlet 2 and an outlet 3 for the products to be cooled. For example, the length of this elongated body is 3 m, its width is 0.8 m and its height 1.1 m. The inlet 2 and outlet 3 have a useful width of 0.3 m and a height of 0.2 m.

The elongated body 1 is extended beyond the inlet section 2 so as to form a support base 5 for the end of a flat conveyor 6 formed by two belt portions 7 and 8 which pass around, at the inlet end 2 and outlet end 3, rollers 9 and 10. In the example represented in the drawings, it can thus be seen that the conveyor extends slightly beyond the inlet end 2 to permit the deposit of products to be cooled, either manually or automatically, while the outlet end of the conveyor in the region of the outlet section 3 permits the discharge of the surface cooled products by a free fall thereof with optionally a reception of these products by another conveyor.

The upper wall or vault 12 of the elongated case 1 acts as a support by means not shown for a plurality of transverse systems, such as those shown at 13, 14, 15, 16, 17 and 18, each equiped with a plurality of spraying nozzles such as those shown at 21, 22, 23 and 24. These nozzles operate by pressure and illustratively may be those commercially available from SRAYING SYSTEM of the type TG03 or TG07. For reasons of fluid flow, these transverse systems are interconnected and supplied through a supply conduit 31, 32 respectively. These two conduits 31, 32 are connected to a single supply conduit 35, connected through a conduit 36 (equiped with a filter 52) to a source, not shown, of carbon dioxide under a pressure of between 6 and 30 bars at the temperature corresponding to the liquid vapour equilibrium state of the CO at the considered pressure, through:

either a conduit 41 having an electrically-operated valve 42 capable of delivering a nominal flow rate of liquid carbon dioxide;

or through a conduit 43 having an electrically-operated valve 44 in series with a "needle" valve 45 regulated for a low flow rate at least 30% lower than the nominal flow rate, this conduit 43 being equiped on the upstream side of the electrically-operated valve 44 with a degassing vessel 46;

or through a conduit 47 equiped, in the downstream direction, with a heater 48, a pressure-reducing valve 49, a check-valve 50 and an electrically-operated valve 51.

In operation, the products are, as mentioned before, placed on the conveyor 6 which moves in the direction of arrow F and, in the permanent operation mode, a temperature probe, not shown, effects the following operations:

when the temperature measured in the refrigeration tunnel is higher than the set temperature by at least a temperature deviation regulated to be between 0.5° C. and 15° C., the regulation is effected in such manner that the electrically-operated valves 42 and 45 are open, whereas the electrically-operated valve 51 is closed. In this case, the nominal flow rate, i.e. the maximum prescribed flow rate, is transferred to the spraying nozzles 24 through the conduits 31, 32, 13, 14, 15, 16, 17 and 18 and the cooling is intense;

when the temperature has dropped to such value that its deviation from the set temperature is relatively small (always between 0.5° C. and 15° C.), the valve 42 is closed; liquid carbon dioxide at a distinctly lower flow rate is conveyed to the conduits 31 and 32 and reaches, as before, the nozzles 21 and 24.

The cooling effect is markedly reduced and usually the temperature is maintained within the imposed temperature deviation. If this deviation of the temperature from the set temperature must be reduced to zero or if the temperature inside the refrigeration tunnel must be lower than said set temperature, the electrically-operated valve 45 is closed and the electrically-operated valve 42 remains closed, while the electrically-operated valve 51 is open, which produces a flow of heated carbon dioxide under low pressure, and therefore in the gaseous state, ensuring a permanent scavenging, even in the absence of cooling, so that any formation of particles of solid carbon dioxide snow capable of forming an obstruction is avoided.

The spraying nozzles 21, 24 have not been described in detail, since they are known per se. However, they have, as mentioned before, the double particularity of on the one hand being all directed toward the products to be cooled, i.e. in a direction perpendicular to the belt 7 of the conveyor 6, and on the other hand of having a relatively narrow outlet section of between 0.2 sq mm and 1.13 sq mm, which permits both the formation of very fine particles of carbon dioxide snow whose dimensions are between 20 and 300 microns and a directivity of these particles toward the products to be cooled owing to the absence of any stirring means inside the tunnel. The distance between the nozzles and the product is on the order of 150 to 300 mm. The ejection rates of the particles from a nozzle are:

for an ejection pressure of 15 bars, on the order of 20 to 25 m/sec at a distance of 50 mm, on the order of 8 m/sec at a distance of 250 mm;

for an ejection pressure of 18 bars, on the order of 25 to 30 m/sec at 50 mm, on the order of 8 to 10 m/sec at a distance of 250 mm.

We claim:

1. A process for surface cooling food products, of the type in which said products are subjected, in a confined zone thermally insulated from the surroundings, to the cryogenic action of particles formed by the expansion of carbon dioxide under pressure and in the liquid state through nozzles oriented toward the mean surface offered by the products in the course of cooling, the process comprising the steps of subjecting the solid particles of the carbon dioxide in contact with the products to quasi-instantaneous sublimation by spraying the particles under pressure through nozzles having an ejection section of between 0.2 sq mm and 1.13 sq mm at an ejection pressure of between 6 and 30 bars, producing a composite jet from each nozzle of carbon dioxide gas and very fine solid particles of sizes between 20 microns and 300 microns, said jet being exclusively composed of carbon dioxide resulting from said expansion, maintaining the aggregate flow rate of fine solid particles in all of said jets lower than 0.5 kg/hr sq cm of surface area of product, and continuing the spraying of said particles by means of said jets for a period of time of between 0.5 minutes and 5 minutes.

2. A surface cooling process according to claim 1, which further comprises controlling the flow of carbon dioxide under pressure and in the liquid state by the temperature measured in said confined zone by maintaining a nominal flow rate of liquid carbon dioxide for a measured temperature higher than a small deviation of between 0.5° C. and 15° C. from a set temperature, reducing the flow rate of liquid carbon dioxide by at least 30% of said nominal flow rate when the measured temperature is within said deviation, and providing a zero liquid carbon dioxide flow for any temperature lower than the set temperature by a value at least equal to said deviation.

* * * * *